United States Patent
Wang et al.

(10) Patent No.: US 6,813,241 B1
(45) Date of Patent: Nov. 2, 2004

(54) NETWORK ARCHITECTURE AND METHOD OF PROVIDING LINK PROTECTION IN A BIDIRECTIONAL DATA TRAFFIC NETWORK

(75) Inventors: Qinglin Wang, Plano, TX (US); Sridhar Swami Nathan, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/465,257

(22) Filed: Dec. 18, 1999

(51) Int. Cl.[7] .................................................. G01R 31/08
(52) U.S. Cl. ....................................... 370/228; 370/216
(58) Field of Search ................................ 370/228, 225, 370/216, 217, 218, 219, 220, 221, 222, 223, 535, 536, 242, 241, 244, 250; 359/117, 128, 139, 110, 127; 385/16, 17

(56) References Cited

U.S. PATENT DOCUMENTS

| | | | | |
|---|---|---|---|---|
| 5,896,474 A | * | 4/1999 | Van Deventer et al. | 385/24 |
| 5,943,314 A | * | 8/1999 | Croslin | 370/216 |
| 6,125,104 A | * | 9/2000 | Shiragaki et al. | 370/216 |
| 6,130,876 A | * | 10/2000 | Chaudhuri | 370/228 |
| 6,307,653 B1 | * | 10/2001 | Bala et al. | 359/110 |
| 6,362,905 B1 | * | 3/2002 | Fukashiro et al. | 359/128 |
| 6,483,803 B1 | * | 11/2002 | Elahmadi et al. | 370/216 |
| 6,507,561 B1 | * | 1/2003 | Baniewicz et al. | 370/216 |
| 6,516,110 B2 | * | 2/2003 | Hayashi et al. | 385/17 |

* cited by examiner

*Primary Examiner*—Douglas Olms
*Assistant Examiner*—Ricardo M. Pizarro
(74) *Attorney, Agent, or Firm*—Hunton & Williams LLP

(57) ABSTRACT

A network architecture for use in a data traffic network that includes a plurality of nodes and a plurality of data links coupling the nodes. The network architecture includes a working data link(220) that forms a signal pathway between a first router (200) and a second router (210) within the network. A protection data link(255) is likewise provided and forms a second signal pathway. The routers (200, 210) include both working data ports (312) and protection data ports (314) with each port including associated transmit and receive terminals. A combination of line splitting devices (250), line selection devices (260) and switch arrays (430, 435) are used to switch the flow of traffic data from the working data link (220) to the protection data link (255) or a protection channel (450) as is appropriate.

25 Claims, 4 Drawing Sheets

NETWORK ARCHITECTURE AND METHOD OF PROVIDING LINK PROTECTION IN A BIDIRECTIONAL DATA TRAFFIC NETWORK

TECHNICAL FIELD

The present invention relates in general to data traffic networks and, in particular, to a configuration of splitters, switches and data link selection devices within a data network to accomplish switching from a working data link to a protection data link and/or protection channel following the detection of a failure or fault in the network.

BACKGROUND OF THE INVENTION

The use of public data networks as data transport mechanisms has proliferated and become common place. For example, network topologies using the Internet Protocol (IP) are now widely used as a means of communicating digital data and voice signals over long distances. An example of an IP-based network is the Internet or World Wide Web.

Typically, data traffic within a data network is transmitted from one location to another utilizing a series of routers, servers, gateways and other devices that are adapted to receive and transmit the data traffic over a series of data links or signaling channels. The routers or routing elements, in particular, utilize a routing algorithm in connection with a routing table to store possible destinations, the distance to such destinations and the route path used to reach them in order to direct data traffic within the network. A plurality of communications links made up of copper pair wiring, fiber optic cabling, or other transmission medium provide the signaling pathways that connect the routers. The distance between the routers is usually measured in "hops" or "nodes," which refer to the number of routers that the data traffic encounters along a particular path. This distance can also be measured in other meaningful quantities.

The routers periodically communicate routing information among themselves propagating updated routing data which can be stored in the routing tables and utilized by the routing algorithms of the network. Each router and its routing table can by dynamically updated to indicate the shortest distance between nodes of the network. In this way, a router can examine the IP packets to be transmitted and, using the routing table, make a routing decision based on information regarding the distance between hop destinations and the overall load of the network. Other network topologies such as ATM switches, for example, use other forms of data routing schemes and other types of signaling protocols.

In general, the capacity of the network is defined by the number of data traffic links available for transmission of data traffic as well as the bandwidth of such links between any two nodes in the network. The bandwidth of the link can be defined in terms of the number of transmitted bids of traffic data per second, such as 1, 10, or 100 Mbits/s. Typically, a network is divided into an array of subnetworks which are associated with specified regions defining the network service area. The concentration of routers and other networking devices can be great in regions where network use is heavy or large amounts of data traffic is flowing. At the very minimum, a specified subregion of the network will include at least two routers or nodes designated as primary data traffic agents for incoming and outgoing data traffic within the subregion.

A factor that can significantly affect the performance of the network and overall network efficiency is the failure of the components and/or the data transmission links used to carry the data traffic. Such failures can be caused by a variety of factors, including cut lines, repairs, severe weather, and upgrades to the network, among others. In optical networks that offer higher transmission speeds (10 Gbit/s, for example) the failure of an optical link can lead to enormous loss of data.

While in most instances, a router is provided with the ability to redirect data traffic along an alternative data link once the primary or working data link has suffered a failure, the fastest possible recovery and reversion to the working data link is desired after detection of the failures. Additionally, while the data traffic can be redirected to ensure receipt at its intended destination node, the use of such alternative paths can increase congestion and decrease overall network performance. With the growing demands for increased speeds and improved data trafficking services, the ability to quickly restore primary transmission links after equipment failure is at a premium.

As such, it would be advantageous to provide an efficient way to overcome the effects of failures within the network and provide fast restoration of transmission links once a failure has been detected.

SUMMARY OF THE INVENTION

The present invention provides a configuration of line splitting and line selection devices that are adapted to provide fast and accurate recovery from equipment failures, such as failures in the primary optical working data link, the line terminating equipment and data routing devices. In the event a failure occurs over the working data link, the flow of data traffic in the network is maintained along a protection data link or a protection channel, as is appropriate. Link protection can be unidirectional or bidirectional to provide a protection mechanism both in the receive and transmit signaling channels. A protection data link and protection channel are provided and utilized to route data traffic in the event the working data link or a router's working data port suffers a failure. Once the failure is repaired, data traffic flow is restored along the working data link or using the working data port to ensure the most efficient use of network resources.

According to one embodiment of the invention, disclosed is a network architecture providing link protection between nodes in a data traffic network. The data traffic network comprises a working data link as a communications pathway between first and second nodes of the network. The network also includes first and second routing elements that are predisposed and configured about the nodes and adapted to communicate data traffic over the working data link. A line or signal splitter is interspersed between the first routing element and the working data link about the first node.

The network also includes a link selector interspersed between the second routing element and the working data link about the second node. A protection data link forms a signal pathway between the signal splitter and the link selector with the signal splitter and link selector configured to switch the flow of data traffic from the working data link to the protection data link following the detection of a failure.

A short reach transmitter and short reach receiver are used and configured to provide communications between the first routing element and the signal splitter. The signal splitter and link selector are predisposed at the first and second nodes, respectively, and communicable coupled to each other through the working data link or protection data link, as determined by the failure status of the working data link. A long reach transmitter and a long reach receiver are used to communicate signals over the working data link or protection data link, as is appropriate.

In one embodiment, the link selector includes an optical line monitor configured to determine the transmission qualities of the working data link and the protection data link. The primary advantage of the monitor is its use to determine when to revert to the working data link after recovery from a failure.

Also disclosed is a network architecture suitable for use in a data traffic network that includes a plurality of nodes and a plurality of data links coupling the nodes. The network architecture includes a working data link that forms a signal pathway between an origination node and a designation node within the network. A protection data link is likewise provided and forms a second signal pathway between the same two nodes. A pair of routers are provided and predisposed about the nodes, respectively, and configured to provide for the transmission and reception of data traffic with the network. In one embodiment, the routers include both working and protection data ports with each set of ports including associated transmit and receive terminals. The routers also include short reach transmitters and receivers for transmitting and receiving data traffic via the data ports.

A line splitting device and a line selection device are used and configured to communicate with the first router using short reach transmitters and receivers. Likewise, a second line splitting device and second line selection device communicate with the second router via short reach transmitters and receivers. The network architecture also includes long reach transmitters and receivers for communicating data traffic over the working and protection data links. The network architecture provides data link protection following the detection of a failure by causing the first and second line splitting devices and the first and second line selection devices to switch between the working and protection data ports or between the working and protection data links, resulting in an almost uninterrupted signal path between the origination and designation nodes of the network.

In one embodiment, the first and second line selection devices each comprise a two-by-two (2×2) switch with inputs coupled to the working and protection data links. In addition, each switch has a first output coupled to the first and second long reach receivers. A link monitor is provided and coupled to a second output terminal of the switch. The link monitor is configured to determine the transmission qualities of both the working and protection data links and is used in determining when the working data link has recovered from a failure.

The network architecture can also include a protection channel and a set of switching arrays coupled to either the protection ports or the working ports of the first and second routers. In this way, the switching arrays can be used to provide an alternative signal pathway for data traffic over the protection channel and from the protection or working ports of the routers. A configuration of short reach and long reach transmitters and receivers are utilized to direct traffic from the protection ports of the routers over the protection channel in the event the short reach or long reach transmission equipment or the associated switches or splitters experience a failure. The first and second switching arrays are preferably configured as a dual switch configuration for handling bidirectional data traffic in both the receive and transmit directions. The switching arrays can be configured in a 1:N arrangement providing localized link protection for a group of routers, or their corresponding ports, against failures in the optical terminating equipment, with N representing the number of ports in the group.

Also disclosed is a method of providing link protection in the event of a failure within a data traffic network consisting of a plurality of routers and a plurality of data links coupling the routers. The method includes the steps of detecting when a failure occurs over a working data link utilized by at least two routers in the network and then switching the flow of data traffic from said working data link to a protection data link until the recovery from the failure has been achieved. A configuration of splitting and link selection devices are used to revert the flow of data traffic from the protection data link to the working data link. The restoration step can be performed by monitoring the working data link to determine when it has recovered from the failure. The method can also include the step of providing a protection channel for carrying data traffic from a group of routers in a first geographic location to a second group of routers in a second geographic location in the event of a failure. The detection, switching and restoration steps can be performed in both the transmit and receive directions providing bidirectional link, switch, splitter, and router protection.

Variations of the above referenced network, network architecture and method are discussed in the following detailed description.

A technical advantage of the present invention is the achievement of link protection with existing routing equipment to provide localized link protection against failures in line components such as amplifiers and regenerators, for example.

Another technical advantage of the present invention is that the selection of a protection data link is automatic once a failure occurs on the working data link with automatic reversion to the working data link once a recovery from the failure has been detected.

BRIEF DESCRIPTION OF THE DRAWINGS

Other aspects of the invention including specific embodiments and advantages are understood by reference to the following detailed description taken in conjunction with the appended drawings in which.

Corresponding numerals and references in the figures correspond to like numerals and references in the detailed description unless otherwise indicated.

DETAILED DESCRIPTION OF THE PREFERRED EMBODIMENTS

The present invention provides a mechanism for a data traffic network that provides redirection of data traffic flow along a protection data link and/or protection channel after the detection of failures in the primary working data link, working data port, or other devices, equipment or components in the network. With the present invention, at least three (3) protection mechanisms are provided to protect against failures in the working data link, the router ports and the transmission terminating equipment. A configuration of optical link splitting and link switching devices including optical switches and optical monitors are provided and configured to redirect data from a failed link or failed data port of a router in a network over a protection data link or protection channel.

Figure 1:
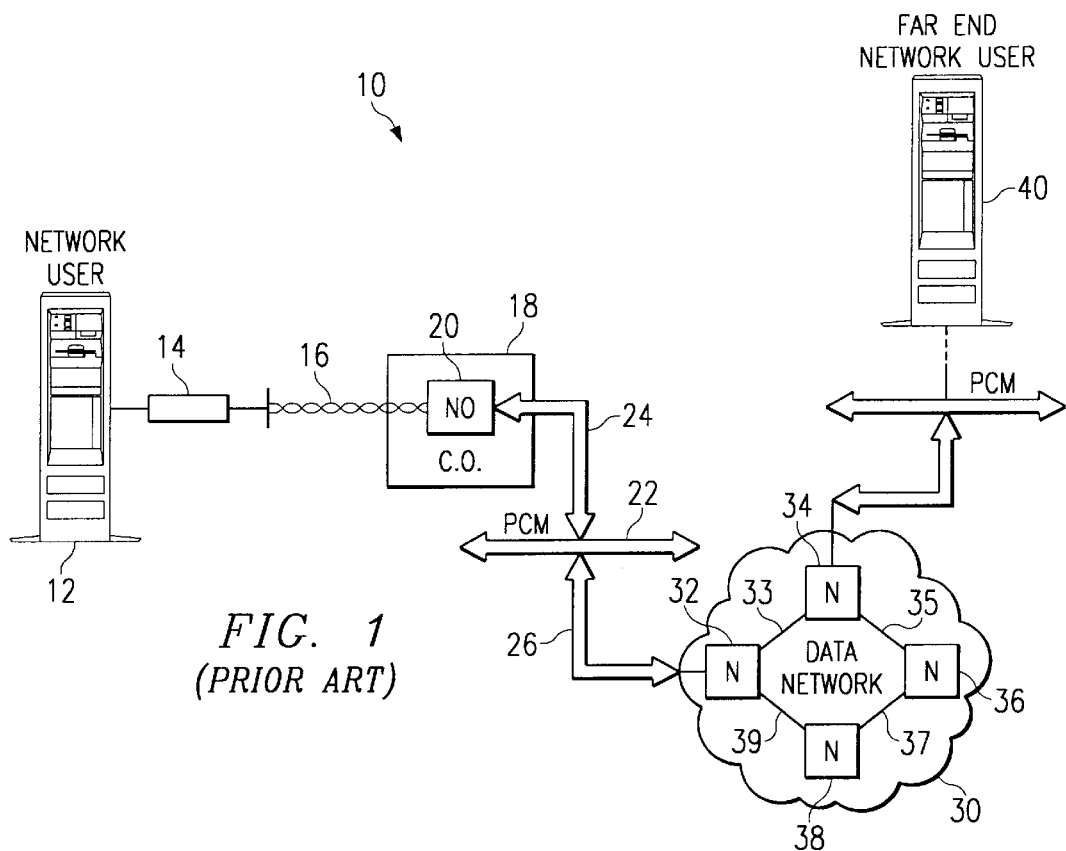
FIG. 1 illustrates an example data networking environment in which the invention can be utilized.

To better understand the invention, reference is made to FIG. 1 which illustrates one variation of a networking environment in which the invention may be utilized. The network of FIG. 1, denoted generally as 10, is utilized by at least one network user using a processing system 12, which can be a computer, workstation or other similar computing platform. The processing system 12 is operably linked to a data network access means, such as the modem 14 which, in turn, is coupled to the transmission link 16 leading to the central office facility 18. In this way, the network user is able to gain access to the data network 30 utilizing the applications and facilities of the processing system 12, modem 14, transmission link 16, and central office 18, among others.

The transmission link 16 typically comprises twisted pair wiring of the type found in the Public Switch Telephone Network (PSTN). Thus, the transmission link 16 would carry analog signals between the network users' processing system 12 and the central office facility 18. An Analog-to-Digital Converter (ADC) 20 within the central office facility 18 is used to interface the analog portion of the network 10 to the digital portion leading to the digital backplane 22. Typically, the digital backplane 22 carries digital bit stream sequences which are Pulse Code Modulated (PCM). The digital backplane provides the coupling mechanism to the data network 30. As shown, corresponding bridge or gateway segments 24, 26 are utilized on either side of the backplane 22 to provide the coupling interface between the central office 20 and the data network 30, respectively. The gateway 26 leading to the data network 30 provides an entryway into the data network 30 via the network node 32.

In general, node 32 is adapted to receive a messages created and formatted according to appropriate signaling standards for the data network 30. The network user, utilizing the computer processing system 12, can format an electronic mail message, for example, intended for the far end network user 40. If so, the address corresponding to the far end network user 40 typically is included within the message header according to well known signaling conventions for the data network 30.

A message could originate at the processing system 12 and travel along the path comprised of the transmission link 16, central office 18, gateway 24, digital backplane 22, and gateway 26 before reaching the node 32 of the data network 30. The node 32 would be equipped with the appropriate routing and switching mechanisms such as a router, routing table, link interfaces, switching and transmission/reception equipment necessary to determine a signaling path within the data network 30 that would guarantee reception of the message by the far end network user 40.

Most often, the path chosen by the node 32 is selected based on present data traffic levels for the network 30, the number of hops to the far end user 40, and efficiency based on the message link and current status as the network 30. For example, the message could traverse the path defined by nodes 32 and 34 of the data network 30. Alternatively, the message could flow through the path defined by nodes 32, 38, 36 and 34. The selection of the signaling path or channel utilized in transmitting the message within the data network 30 is a function of the routing algorithms and routing equipment used within the nodes 32, 34, 36 and 38.

The invention has particular application with respect to the utilization of the data traffic or transmission links 33, 35, 37, and 39 coupling the nodes 32, 34, 36 and 38 of the data network 30. In particular, the invention can be utilized where one of the data traffic links 33, 35, 37, and 39 experiences a failure such that transmission of data traffic over a specific traffic link becomes unfeasible. Typically, the data network 30 and the facilities thereof, are configured to reroute data from a link where a failure or working data link has occurred to an alternative link within the data network 30. Given the premium placed on overall network efficiency and data throughput, a means of providing link protection with fast, reliable restoration of data traffic flow along the working data decrease is desirable.

Figure 2:
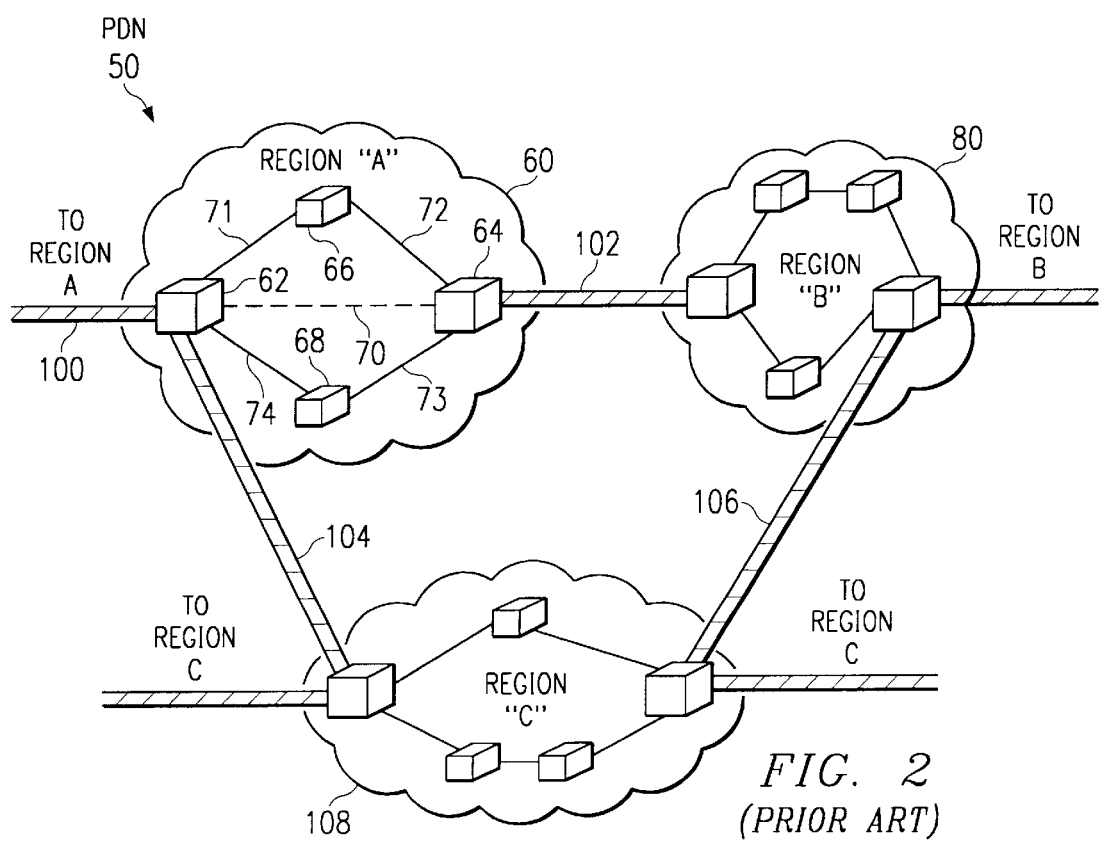
FIG. 2 is a broad view of a public data network illustrating the arrangement of routers and data links coupling the routers.

Having described a general topology for one example of a data traffic network, reference is made to FIG. 2, which illustrates the arrangement of a Public Data Network (PDN), denoted generally as 50, in more detail. Generally, the PDN 50 is comprised of a number of service regions 60, 80, and 108 (or Regions A, B, and C, respectively). The PDN 50 facilitates the communication of data traffic within the network service area as defined by the service regions 60, 80 and 108. Typically, a service provider is responsible for installing, maintaining and updating the hardware and software facilities pertaining to a given region based on the needs of the region and service level qualities desired for that region.

As shown, each region has incoming data traffic links which are used to direct data traffic into and out of a region through, for example, two (2) primary nodes of the region. For example, a traffic link 100 can be used to carry data traffic into the Region A via node 62. Node 62 acts as the primary entry point into the Region A for data traffic originating over the data traffic link 100. Likewise, inter-region communications are facilitated through a traffic link 102 that couples neighboring regions (Region A and Region B) to one another. Node 64 acts as the primary interface to Region A for this purpose. In general, the links in most modern data network are optical transmission lines providing high speed data transmission capabilities.

Within a particular region, the number of nodes, traffic links, routes, and other facilities can vary from region to region. For example, Region A is seen as including nodes 62, 64, 66 and 68. The nodes are coupled to each other through traffic links 71, 72, 73 and 74, which provide the signaling pathways or channels for transmitting data amongst the nodes. An inter-peer link 70 can be provided as a traffic link between the primary nodes 62, 64 of the region 60. Likewise, alternate routes to other regions or from a given region are provided through data traffic links 104 and 106.

Figure 3:
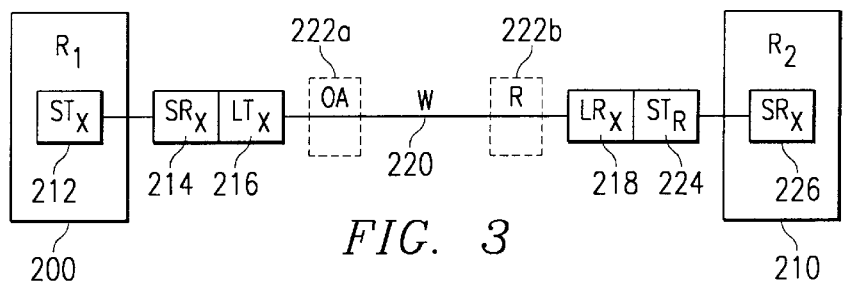
FIG. 3 illustrates the flow of data traffic along a working data link, and from one router to a second router.

With reference to FIG. 3, therein is shown a block diagram of the functional components utilized in transmitting data traffic from a first router 200 to a second router 210 within a data traffic network, such as PDN 50. Essentially, the first and second routers, 200 and 210, are predisposed and configured to provide service within the data traffic network at first and second nodes of the network. Assuming traffic flow from the first router 200 to the second router 210, a short reach transmitter 212 within the first router 200 works in connection with a short reach receiver 214 to carry the data traffic from the first router 200 to equipment capable of transmitting the data traffic over relatively long distances. This configuration of short reach and long reach transmission equipment facilitates significant cost reductions in the routing equipment. As such, a long reach transmitter 216 is provided as the communications device between the first router 200 and the long reach receiver 218 at a distant point within the network.

A working data link 220 is used as the transmission channel coupling the long reach transmitter 216 to the long reach receiver 218. Typically, the working data link 220 provides the preferred signal pathway for data traffic flowing between the first router 200 and the second router 210. The working data link 220 can be selected from any of a variety of transmission mediums such as copper twisted pair wiring, fiber optic cabling, or other suitable transmission medium. As shown, the working data link 220 can include one or more optical amplifiers 222A and/or regenerators 222B which can be used to compensate for line losses and signal quality degradation resulting from the transmission of the data traffic over the working data link 220.

The distance spanned by the working data link 220 can vary, depending on the network topology. Once data traffic reaches the long reach receiver 218, it can be passed to the short reach transmitter 224 and on to the short reach receiver 226 within the second router 210. While the architectural scheme illustrated in FIG. 3 is described in connection with data traffic flow in one direction (i.e. from router 200 to router 210), it should be understood that a similar configuration of long reach and short reach transmission devices and data traffic links would be used in the opposite direction, providing a bidirectional communications system.

As is appreciated by those of ordinary skill, the network architecture illustrated in FIG. 3 is subject to various failures including a cut or break in the working data traffic link 220, a failure of the optical amplifiers 222A and/or regenerators 222B or of the short reach (212, 214, 224, 226) or long reach (216, 218) data transmission equipment due to upgrades, repairs or other disturbances that may effect the flow of data traffic over the working data link 220. A failure of the working data link 220, even momentarily, can severely effect the overall efficiency of the network resulting in congestion and bottlenecking as well as possible loss of data traffic. What is needed is a reliable and fast means of recovering from such a failure to ensure that data traffic reaches the appropriate destination once the failure has been detected.

Figure 4:
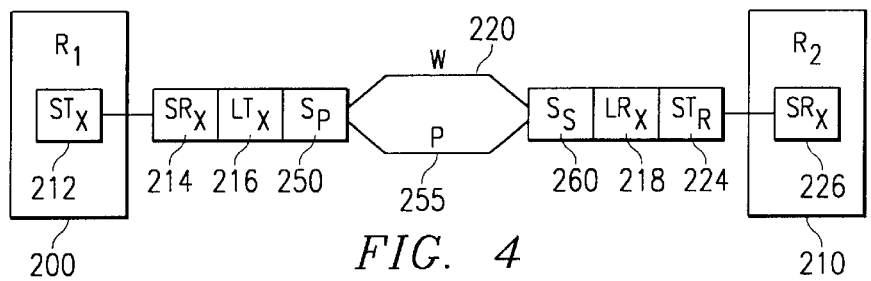
FIG. 4 illustrates the use of a line splitting device and a line selection device, according to another aspect of the present invention.

FIG. 4 shows a modified network architecture, denoted generally as 240, according to one embodiment of the invention. As shown, an optical signal splitting device (Sp) 250 has been interspersed between the long reach transmitter 216 and the working data link 220. This gives the network architecture 240 the ability to select from a working data link 220 and a protection data link 255 extending from the line splitting device 250 to a line selection device (Ss) 260. The line selection device 260 operates essentially the same as the line splitting device 250 to select a suitable and functional data traffic link, either 220 or 255, for carrying the data traffic intended for the second router 210.

The invention includes the ability to operate the line splitting device 250 and the line selection device 260 in order to reroute data traffic from the working data traffic link 220 over the protection data link 255 when a failure is detected over the working data link 220. Numerous means of implementing the line splitting device 250 and the line selection device 260 are contemplated, including optical switches or splitters as well as other similar switching equipment well known to those of ordinary skill in the art.

In most data networks, the selection of a working data link 220 amounts to selecting a signal routing path that is the preferred traffic channel between the first router 200 and the second router 210. The selection of the working data link 220 is thus a function of various factors including current traffic conditions, capacity, and distance between the routers 200 and 210, among others. While the protection data link 255 may not be the preferred traffic channel, it does provide an alternative pathway for data traffic between the first router 200 and the second router 210, thus providing a reliable transmission medium when a failure is detected that would prevent transmission over the working data link 220. The line splitting device 250 and line selection device 260 therefore incorporate the intelligence necessary to select an the protection data link 255 when the preferred working data link 220 has failed.

Figure 5A:
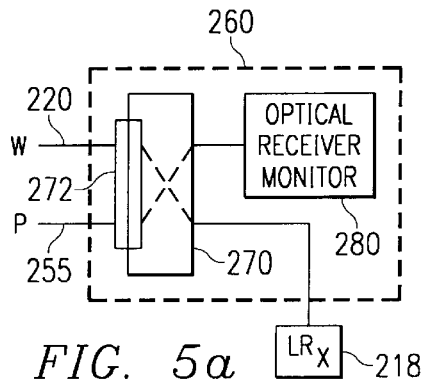
FIGS. 5A and 5B show the placement of an optical monitor at the line selection device, according to another aspect of the invention.
Figure 5B:
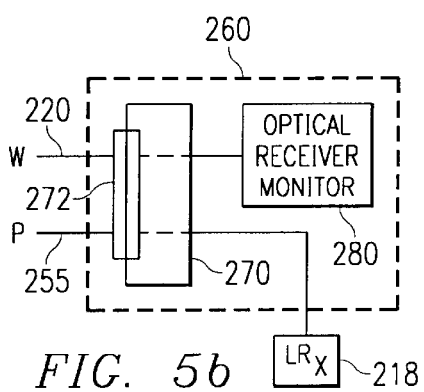

FIGS. 5A and 5B illustrate the line selection device 260 in more detail, according to another aspect of the invention. The line selection device 260 can include a two-by-two switch 270 with an input terminal 272 providing the interface to the working data link 220 and the protection data link 255. In the typical configuration, the logic within the two-by-two switch 270 causes the working data link 220 to be switched to the long reach receiver 218 under normal operating conditions. Once a failure condition is detected by the long reach receiver 218, a triggering event causes a switch within the two-by-two switch 270 from the working data link 220 to the protection data link 255 as shown in FIG. 5B. In this configuration, the working data link 220 is directly coupled to a monitoring device 280, which in one embodiment comprises an optical receiver/monitor capable of determining when the working data link 220 has recovered from a failure. Since the working data link 220 is the preferred signaling pathway, reversion to the working data link 220 is desired.

The two-by-two switch 270 can include switching control logic (not shown) which implements a short holding time so that switching between the working data link 220 and the protection data link 255 occurs only when a failure condition is persistent during the holding time. The holding time can vary from a few frames of data to a few milliseconds, according to various embodiments. In other embodiments, the switching from the working data link 220 to the protection data link 255 can be manually controlled or triggered by a command sent by the network operator or by a bidirectional switching command sent from a remote node in the network. Once the long reach receiver 218 detects a failure condition that triggers a switching event, the switching control logic triggers the two-by-two switch 270 so that the long reach receiver 218 will receive data traffic from the protection data link 255 as long as the protection data link 255 is available. At the same time, the monitoring device 280 receives signals from the working data link 220 which enables it to monitor the status of the working data link 220 and determine when reversion to the working data link 220 is possible.

The fact that the line splitting device 250 and line selection device 260 are utilized to switch from a working data link 220 to a protection data link 255 provides a network architecture with link protection and fast recovery from the various types of failures that the working data link 220 may experience. Since switching from the working data link 220 to the protection data link 255 can be completed in a short time period (for example, 10 ms), a network architecture with fast and reliable restoration of preferred traffic channels is provided. With this architecture, only one long reach transmission device is required at each end of the transmission link resulting in great economic savings.

The invention can be utilized in instances where one or more of the data traffic links within a given region of the data traffic network experience a failure. Numerous factors can contribute to the cause of such failures including lack of maintenance of network equipment, line cuts, repairs, and other fault-inducing conditions as can be appreciated by those of ordinary skill in the art. In this regard, the terms "node", "router" and/or "routing element" are used interchangeably throughout, depending on the context in which the term is used.

Figure 6:
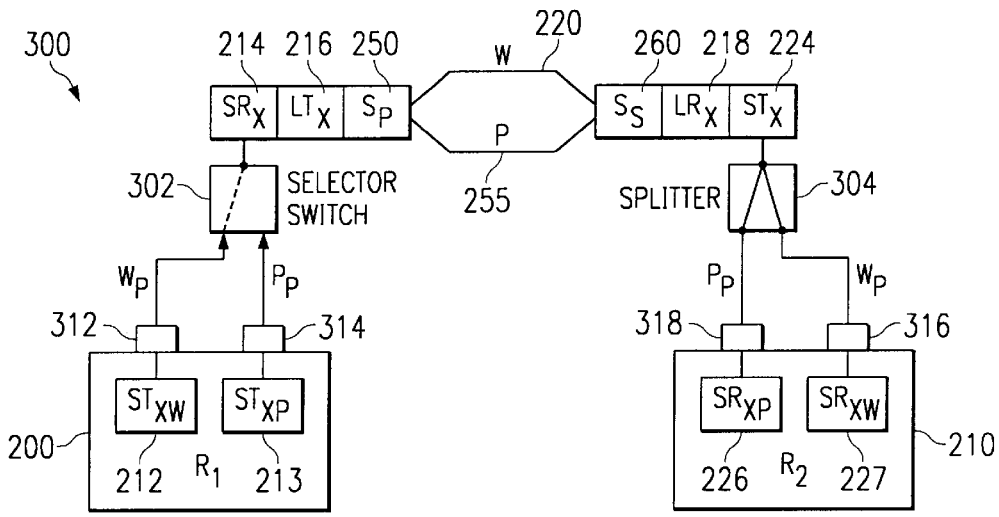
FIG. 6 illustrates routers with both a working and protection data port, according to still another aspect of the invention.

With reference to FIG. 6, therein is shown an architectural scheme, denoted generally as 300, for a network providing localized link protection, according to one embodiment of the invention. The first router 200 and second router 210 are now seen to include corresponding working data ports 312, 316 and protection data ports 314, 318 (collectively referred to as "data ports"). The data ports are communicable coupled to corresponding line selector switch 302 and line splitter 304 which act as an interface between the routers 200, 210 and the short reach transmission equipment within the routers at each end of the traffic channel. In this way, localized link protection is provided at the interface to the routers 200, 210. That is, if the short reach transmission equipment detects a failure of the working data port 312, the selector switch 302 could be triggered to connect the short reach receiver 214 to the protection data port 314. Similarly, the router 210 will use the protective data port 318 for receiving if it detects a failure of the working data port 316. This network configuration 300 provides a reliable restoration of data traffic flow from failures occurring at the routing elements within the network.

Figure 7:
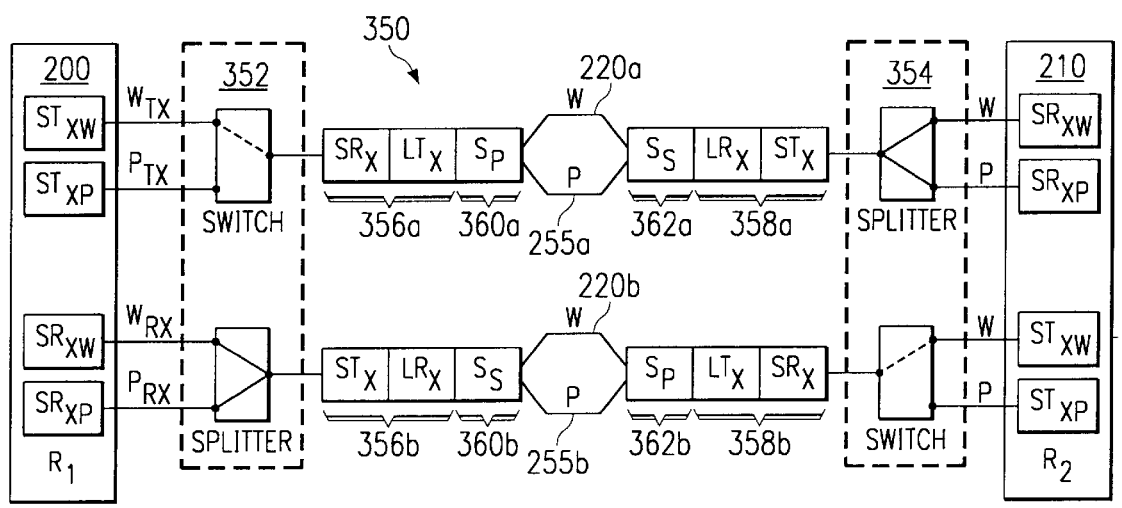
FIG. 7 shows bidirectional link protection in a network architecture, according to one embodiment of the invention.

The present invention provides a network architecture and method of protecting against link and router ports failures occurring both in the transmit and receive directions of a data traffic link. FIG. 7 illustrates a network architecture denoted generally as 350, with link protection in both the receive and transmit directions of a two router traffic channel, according to one embodiment of the invention. A first router 200 and second router 210 are, as before, adapted to serving two nodes of a data traffic network.

The architecture 350 is seen to include a first set of line switch and splitter 352 and a second set of line switch splitter 354 coupled to the first router 200 and second router 210 respectively. Switch and splitter sets 352, 354 include corresponding line switching and splitting elements dedicated for the transmit and receive directions of the transmission channel. Next, combination short reach and long reach receivers and transmitters 356a, 356b provide bidirectional communications between the first router 200 and traffic links 220, 255. Likewise, a set of short reach and long reach transmitters and receivers 358a, 358b is provided near the router 210. The line selection 360b, 362a and line splitting 360a, 362b devices are interspersed between the transmitter and receiver blocks, 356a, 356b, 358a and 358b, and adapted to select a data traffic link, either the working data link 220a, 220b or the protection data link 225a, 225b, depending on the fault status of the working data link 220a, 220b.

Figure 8:
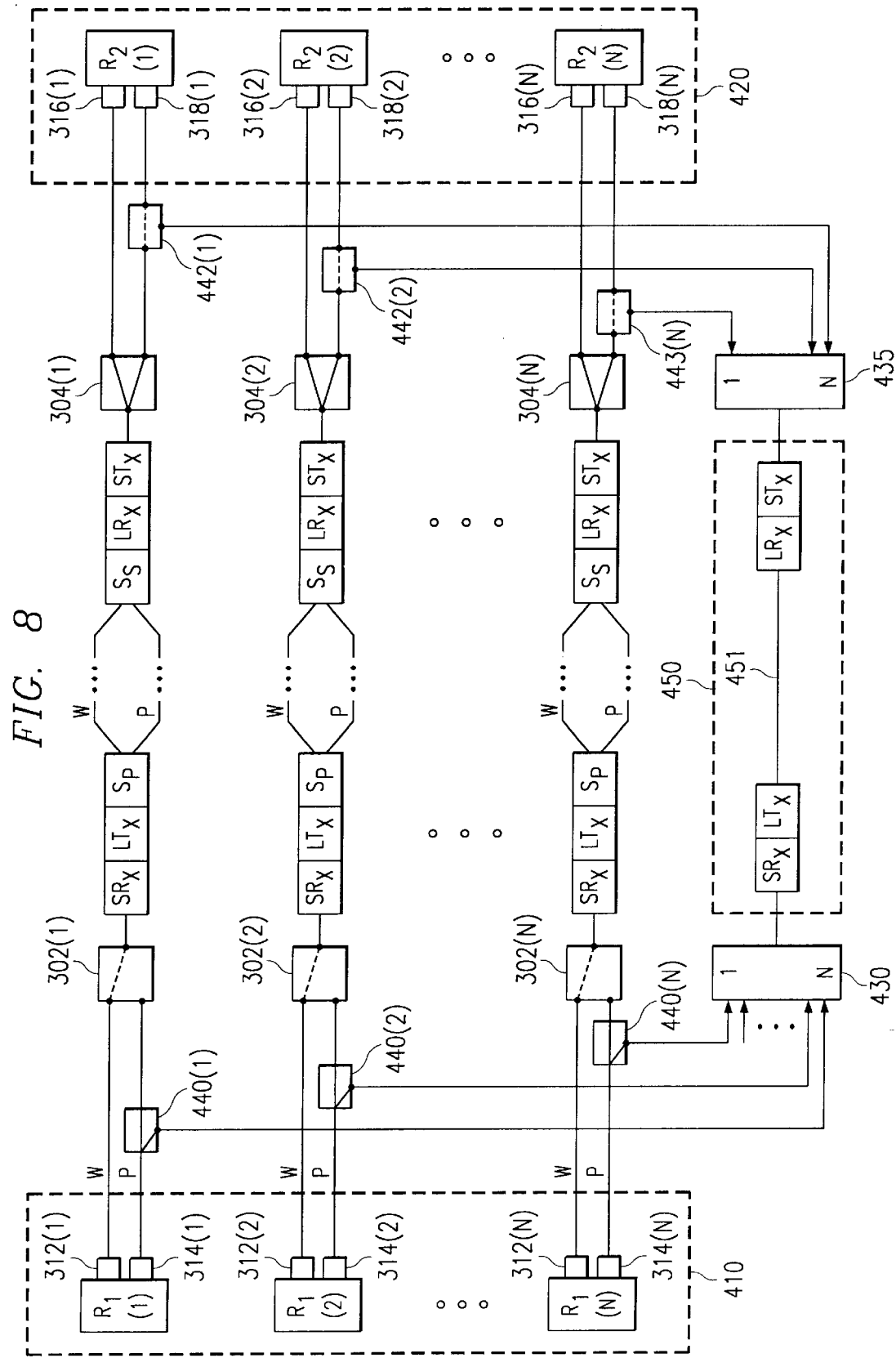
FIG. 8 illustrates the use of a protection channel providing data traffic flow between a first and second group of routers, according to one embodiment of the invention.

The addition of the switch 302 and splitter sets 352 and 354 as well as the line splitting and line selection devices, 360a, 360b, 362a, and 362b, as well as the short and long reach equipment STx, SRx, LTx and LRx, can increase the potential failures on the transmission channel and reduce network transmission reliability under certain conditions. Therefore, in addition to the link protection and router port protection schemes disclosed herein, the present invention contemplates the use of a protection channel to serve as an additional protection mechanism for a data traffic network. With reference to FIG. 8, therein is shown a network architecture, denoted generally as 400, with a protection channel 450 provided therein.

The network architecture 400 is seen to include a first group of routers 410, each router in the group 410 including a number of data ports, with each individual router in the group 410 configured substantially as described herein. Essentially, the routers within the first group 410 are situated within the same geographical location of the data traffic network. Likewise, a second group of routers 420 are provided and situated within a second location of the data traffic network in which the network architecture 400 is implemented. Each of the routers in the first group 410 contains a combination of data ports. In some embodiments, the routers contain both working data ports 312(1):312(N) and protection data ports 314(1):314(N). The protection data ports 314(1):314(N) of each of the routers is coupled to a switching array 430, having N number of inputs corresponding to the N number of router ports within the group 410. The data links coupling the protection data ports 314 to the switching array 430 span a relatively short distance compared to the data links of the protection channel 450.

The routers within the second group 420 are similarly configured with corresponding working data ports 316(1):316(N) and protection data ports 318(1):318(N) provided for each router in the group 420. In other configurations, the routers have more or less data ports. As shown, routers in group 420 includes N number of ports and N number of data links coupling the protection ports 318(1):318(N) to a second switching array 435 are provided. The protection channel 450 includes the necessary short reach transmitters and receivers as well as the necessary long reach transmitters and receivers necessary to divert traffic data from the protection ports 314(1):314(N), 318(1):318(N), over a protection data link 451. Thus, the architecture of the protection channel 450 mirrors that of the network architecture in general with an alternative traffic channel 450 provided in case a failure of the line splitting, line selection or short/long reach devices occurs.

Since the protection channel 450 provides an alternate signaling pathway for a group of routers in a given geographic location, the switching arrays 430 and 435 can be used to switch a selected channel, as may be appropriate, along the protection channel 450. In this way, protection switching due to the failures in the transmission equipment is provided.

Figure 9:
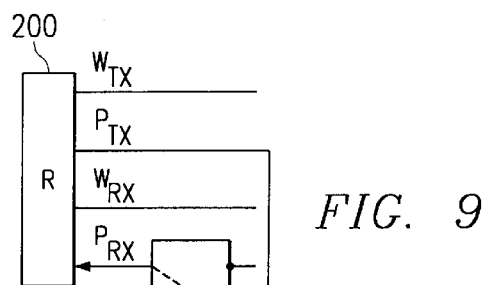
FIG. 9 illustrates a switch array in a dual switch configuration for bidirectional link protection over a protection channel, according to one embodiment of the invention.

The protection channel 450 and switching arrays 430 and 435 provide protection switching for N number of router ports in both the transmit and receive directions. To accommodate bidirectional protection switching over the protection channel 450, two 1:N switches are required. A dual switch configuration in the switching array 430 is illustrated in FIG. 9 as comprising a first switch (SW1) 452 and a second switch (SW2) 454. The switching of data traffic flow from a router 200 to the switching array 430 can be coordinated by a protection controller (not shown) that also controls the switching back to the normal working channel once the failure condition has been removed.

While the invention has been described in the context of preferred and illustrative embodiments, it should be understood that the present invention provides numerous concepts that may have application in other data networking environments where the reliability of the transmission resources and the integrity of the data traffic flow are at a premium. Various modifications-and variations of the present invention will become apparent to those of ordinary skill in the art and it is intended that such variations and modifications be part of the invention.

What is claimed is:

1. A data traffic network providing link protection between nodes in the network comprising:
   a working data link forming a communications pathway between first and second nodes of said data traffic network;
   first and second routing elements predisposed about said first and second nodes, respectively, and adapted to communicate data traffic over said working data link;
   a signal splitting means disposed between said first routing element and said working data link;
   a link selection means disposed between said second routing element and said working data link; and
   a protection data link forming a signal path between said signal splitting means and said link selection means;
   wherein said signal splitting means and link selection means are configured to protect the flow of traffic data between said first and second nodes by causing a switch from said working data link to said protection data link following the detection of a failure over said working data link, and
   wherein said link selection means comprises:
      an optical switch with first and second inputs and first and second outputs, said first and second inputs coupled to said working data link and protection data link, said first output utilized to communicate data traffic to said second routing element; and
      an optical monitor communicably coupled to said second output of said optical switch and configured to determine the transmission qualities of said working data link and protection data link.

2. The data traffic network of claim 1 wherein each of said first and second routing elements further comprise a first short reach transmitter and a first short reach receiver for transmitting and receiving data traffic over and from said working data link or said protection data link.

3. The data traffic network of claim 2 further comprising:
   a second short reach receiver and second short reach transmitter adapted to communicate with said first short reach transmitter and said first short reach receiver, respectively; and
   a first long reach transmitter and a first long reach receiver adapted to communicate with said second short reach receiver and said second short reach transmitter, respectively, for providing a communications interface for data traffic transmitted and received by said first routing element over either said working data link or said protection data link.

4. The data traffic network of claim 2 further comprising:
   a third short reach transmitter and a third short reach receiver adapted to provide communications between said second routing element and said link selection means; and
   a second long reach transmitter and second long reach receiver adapted to communicate with said third short reach receiver and third short reach transmitter, respectively, and configured to provide a communications interface for data traffic transmitted and received by said second routing element over either said working data link or said protection data link.

5. The data traffic network of claim 1 wherein said optical monitor is configured to determine when said working data link has become suitable for carrying data traffic following the detection of a failure over said working data link.

6. The data traffic network of claim 1 wherein said optical monitor is configured to determine when said protection data link has failed and needs repair.

7. Within a data traffic network including a plurality of nodes and a plurality of data links coupling said nodes, a network architecture providing recovery from link and router component failures comprising:
   a working data link forming a first signal pathway between a first node and a second node in the network;
   a protection data link forming a second signal pathway between said first node and said second node;
   first and second routers predisposed about said first and second nodes, respectively, and configured to transmit and receive data within said network, said routers including data ports and a first set of short reach transmitters and receivers for transmitting and receiving data traffic via said data ports;
   a second set of short reach transmitter and receivers;
   a third set of short reach transmitter and receivers;
   first line splitting and line selection devices communicably coupled to said first router via said second set of short reach transmitters and receivers;
   second line splitting and line selection devices communicably coupled to said second router via said third set of short reach transmitters and receivers;
   first long reach transmitters and receivers disposed between said second set of short reach transmitters and receivers and said working and protection data links; and
   second long reach transmitters and receivers disposed between said third set of short reach transmitters and receivers and said working and protection data links opposite said first long reach transmitters and receivers;
   wherein said first and second line splitting devices and said first and second line selection devices are configured to switch between said data ports as well as said working and protection data links to ensure that a substantially uninterrupted signal path exists between said first and second nodes.

8. The network architecture of claim 7 wherein data ports further comprise working and protection data ports.

9. The network architecture of claim 7 wherein said first and second line selection devices each comprise:
   a two-by-two switch having first and second inputs coupled to said working and protection data links, respectively, and first and second outputs, each of said first outputs coupled to a said first and second long reach receivers, respectively; and
   a link monitor communicably coupled to said switch and configured to determine the transmission qualities of said working and protection data links.

10. The network architecture of claim 7 further comprising:
    a protection channel providing a signal pathway between said first and second nodes;
    first and second switching arrays providing a signal pathway for data traffic over said protection channel; and
    a first splitter and a first selector, each respectively coupled to corresponding data ports of said first and second routers; and
    a link extending from data ports of said first and second routers to said first and second switching arrays, respectively;

wherein said first and second switching arrays are configured to provide a bypass of data traffic from data ports of said first and second routers over said protection channel.

11. The network architecture of claim 10 further comprising:
   first and second short reach transmitters and receivers communicable coupled to said first and second switching arrays for transmitting and receiving data traffic to and from said first and second routers, respectively;
   first and second long reach transmitters and receivers communicably coupled to said first and second short reach transmitters and receivers, respectively, for transmitting and receiving said data traffic to and from said first and second short reach transmitters and receivers over said protection channel.

12. The network architecture of claim 10 wherein each of said first and second switching arrays are configured as a dual switch configuration for handling incoming and outgoing data traffic.

13. The network architecture of claim 12 wherein each of said dual switch configuration are communicably coupled to corresponding receive and transmit terminals of corresponding data ports of said first and second routers.

14. In a data traffic network comprising a plurality of routers and a plurality of communication links coupling said routers, said routers configured to select from said plurality of communication links to form working data links for the transmission of data traffic between nodes of the network, a network architecture providing protection against equipment or link failures so that data traffic can be routed from one node in the network to a second node in the network after the detection of such failures, the network architecture comprising:
   a plurality of protection data links providing signal pathways between any two of said routers;
   means of providing localized link protection between any two of said routers, said means configured to switch from a working data link to a protection data link after the detection of one or more failures on the working data link;
   at least one protection channel providing a signal pathway between a first group of routers situated in one geographic location and a second group of routers situated within a second geographic location of said network; and
   means of providing group protection for any router within said one or second geographic locations, said means configured to provide an alternate signal pathway for data traffic from any one of said first and second group of routers through said protection channel.

15. The network architecture of claim 14 said routers include a plurality of data ports adapted to support bi-directional communications for said routers, said data ports adapted as working data ports and protection data ports.

16. The network architecture of claim 14 wherein each of said means of providing localized link protection comprises:
   a first line splitter with a first terminal coupled to corresponding protection data ports of said routers, and also comprising second and third terminals; and
   a second switch with a first terminal coupled to said second terminal of said first line splitter for receiving data traffic from the corresponding router, and also comprising a second terminal coupled to said working data port of said corresponding router and a third terminal.

17. The network architecture of claim 16 further comprising corresponding links extending from each third terminal of said first line splitter to said means of providing group protection.

18. The network architecture of claim 16 further comprising short reach transmitters and receivers communicably coupled to said third terminals of said second switch for receiving and transmitting data over either said working data links or said protection data links.

19. The network architecture of claim 16 wherein each of said first line splitters is configured to direct data traffic either through said second switch or through said means of providing group protection following the detection of failures over either said working data links, said working data ports or protection data links.

20. The network architecture of claim 14 wherein each of said means of providing group protection comprises:
   a first 1:N switch array communicably coupled to said means of providing localized link protection for router in said first group, N representing the number of router ports in said first group;
   a second 1:N switch array communicably coupled to said means of providing localized link protection for routers in said second group, N representing the number of router ports in said second group.

21. The network architecture of claim 20 wherein said means of providing group protection further comprises:
   first short reach transmitters and receivers configured to communicate with said means of providing link protection for routers in said first group;
   second short reach transmitters and receivers configured to communicate with said means of providing link protection for routers in said second group;
   first and second long reach transmitters and receivers configured to communicate traffic data received from both said first and second short reach transmitters and receivers over said protection channel.

22. In a data traffic network consisting of a plurality of routers and data links providing signal pathways between said routers, a method of protecting the communication of data traffic between any two of said routers in the event of failure, said method comprising the steps of:
   (a) detecting when a failure occurs over a working data link utilized by at least two routers in said network;
   (b) a set of link splitting and link selecting devices switching the flow of data traffic from said working data link to a protection data link; and
   (c) the splitting and link selecting devices restoring the flow of data traffic from said protection data link to said working data link once a recovery of the working data link has occurred,
   wherein said restoring step is performed by monitoring at said link selecting device the working data link to determine when it has recovered from the failure.

23. The method of claim 22 further comprising the step of providing a protection channel for carrying data traffic from a group of routers in a first geographic location to a group of routers in a second geographic location.

24. The method of claim 23 further comprising the step of directing data traffic from a data port of a router coupled to a failed working or protection data link to said protection channel.

25. The method of claim 24 wherein said step of directing is performed by switching a channel from said data port of said router to a switch array communicably coupled to said protection channel.

* * * * *